(12) United States Patent
Jang et al.

(10) Patent No.: US 7,364,316 B2
(45) Date of Patent: Apr. 29, 2008

(54) BACKLIGHT UNIT

(75) Inventors: Hoon Jang, Gyeonggi-do (KR); Jong Hyun Choi, Incheon (KR)

(73) Assignee: LG.Philips LCD Co., Ltd., Seoul (KR)

( * ) Notice: Subject to any disclaimer, the term of this patent is extended or adjusted under 35 U.S.C. 154(b) by 160 days.

(21) Appl. No.: 11/395,163

(22) Filed: Apr. 3, 2006

(65) Prior Publication Data

US 2006/0221639 A1 Oct. 5, 2006

(30) Foreign Application Priority Data

Apr. 4, 2005 (KR) .............................. 2005-028172

(51) Int. Cl.
*G09F 13/04* (2006.01)

(52) U.S. Cl. ......................... 362/97; 362/97; 362/225; 362/33; 362/561; 362/234; 349/62; 349/65; 349/68; 349/60; 349/63

(58) Field of Classification Search ..................... None
See application file for complete search history.

(56) References Cited

U.S. PATENT DOCUMENTS

| | | | |
|---|---|---|---|
| 7,195,367 B2* | 3/2007 | Hong et al. .................... 362/97 |
| 7,258,462 B2* | 8/2007 | Yamashita et al. ........... 362/225 |
| 7,264,373 B2* | 9/2007 | Huang et al. ................. 362/219 |
| 2003/0142487 A1* | 7/2003 | Fan ............................... 362/29 |
| 2004/0223319 A1* | 11/2004 | Chou et al. .................... 362/97 |
| 2004/0232854 A1* | 11/2004 | Chou ........................... 315/291 |
| 2006/0061305 A1* | 3/2006 | Ahn et al. .................... 315/312 |
| 2007/0001626 A1* | 1/2007 | Park ............................. 315/312 |
| 2007/0002554 A1* | 1/2007 | Lim ............................... 362/97 |

* cited by examiner

*Primary Examiner*—Sandra O'Shea
*Assistant Examiner*—Danielle Dunn
(74) *Attorney, Agent, or Firm*—Morgan, Lewis & Bockius LLP (57) ABSTRACT

A backlight unit includes a case; a plurality of fluorescent lamps on the case, each fluorescent lamp having ends arranged in one direction, and having first and second electrodes provided at respective ends; a first power supply line connected with the first electrode; a second power supply line connected with the second electrode; a common electrode PCB arranged adjacent to the ends of the fluorescent lamps; a first common electrode on the common electrode PCB and connected with the first power supply line;
a second common electrode on the common electrode PCB and connected with the second power supply line, the first and second common electrodes being spaced apart from each other; and an inverter to apply voltages to the first and second common electrodes.

34 Claims, 10 Drawing Sheets

BACKLIGHT UNIT

This application claims the benefit of the Korean Patent Application No. P2005-028172, filed on Apr. 4, 2005 in Korea, which is hereby incorporated by reference.

BACKGROUND OF THE INVENTION

1. Field of the Invention

The present invention relates to a backlight unit, and more particularly, to a backlight unit that enables efficient parallel driving of external electrode fluorescent lamps (EEFLs).

2. Discussion of the Related Art

Cathode ray tubes (CRTs) have been widely used for computer monitors, televisions, measuring machines and information terminals. However, CRT technology fails to meet the current trend of minimizing the weight and size of a display device. Accordingly, display device technology such as liquid crystal display (LCD) devices based on optoelectronic principles, plasma display panel (PDP) devices using a gas discharge, and electroluminescence display (ELD) devices based on the electric field luminous effect have been studied to substitute CRT technology. Among those display devices, the LCD device has been most actively studied.

LCD devices have the advantageous characteristics such as compact size, light weight, and low power consumption. Therefore, LCD devices have been actively used for laptop computers, desktop computers, and large-sized display devices. This trend explains the strong demand for the LCD devices today. Most LCD devices control the light transmittance to display images. To enhance the luminance, it is necessary to form an additional light source such as a backlight unit in an LCD panel. In general, the backlight unit used as the light source of an LCD device has one or more cylindrical fluorescent lamps which may be classified into two types according to the arrangement of the fluorescent lamps: a direct type and an edge type.

For the edge type backlight unit, a lamp unit is provided at one side of a light-guiding plate. The lamp unit includes a lamp for emitting light, a lamp holder inserted into both ends of the lamp to protect the lamp, and a reflective sheet having one side inserted to the light-guiding plate and surrounding the circumference of the lamp to reflect the light emitted from the lamp to the light-guiding plate. In this respect, the edge type backlight unit is generally applied to relatively small sized LCD devices such as laptop computer and the desktop computer.

With the recent trend for the large-sized LCD device having 20-inch screen size or more, the direct type backlight unit has been actively developed. The direct type backlight unit includes a plurality of lamps formed along single line on a lower surface of a light-diffusion sheet, whereby an entire surface of the LCD panel is directly illuminated with the light. The direct type backlight unit, which has greater light efficiency as compared with the edge type backlight unit, is used for the large-sized LCD device because large-sized LCD device requires high luminance. Accordingly, the LCD device of the direct type backlight unit is generally used for the large-sized monitor or television. The large-sized monitor or television may be used for a long time. However, since the direct type backlight unit includes the plurality of lamps, some of the lamps may malfunction.

In contrast, the edge type backlight unit only causes a slight decrease in luminance even though some lamps may fail to function properly. The edge type backlight unit will not significantly affect the luminance on the entire LCD panel. However, the direct type LCD device has a plurality of lamps provided underneath a screen of the LCD panel. Accordingly, if one of the lamps fails due to some reasons, a portion of screen corresponding to the failed lamp becomes darker. Thus, the lamp is required to be exchanged frequently in the direct type LCD device. Accordingly, it is necessary for the direct type LCD device to have a simple structure that allows one to disassemble or to assemble the lamp unit easily.

Figure 1:
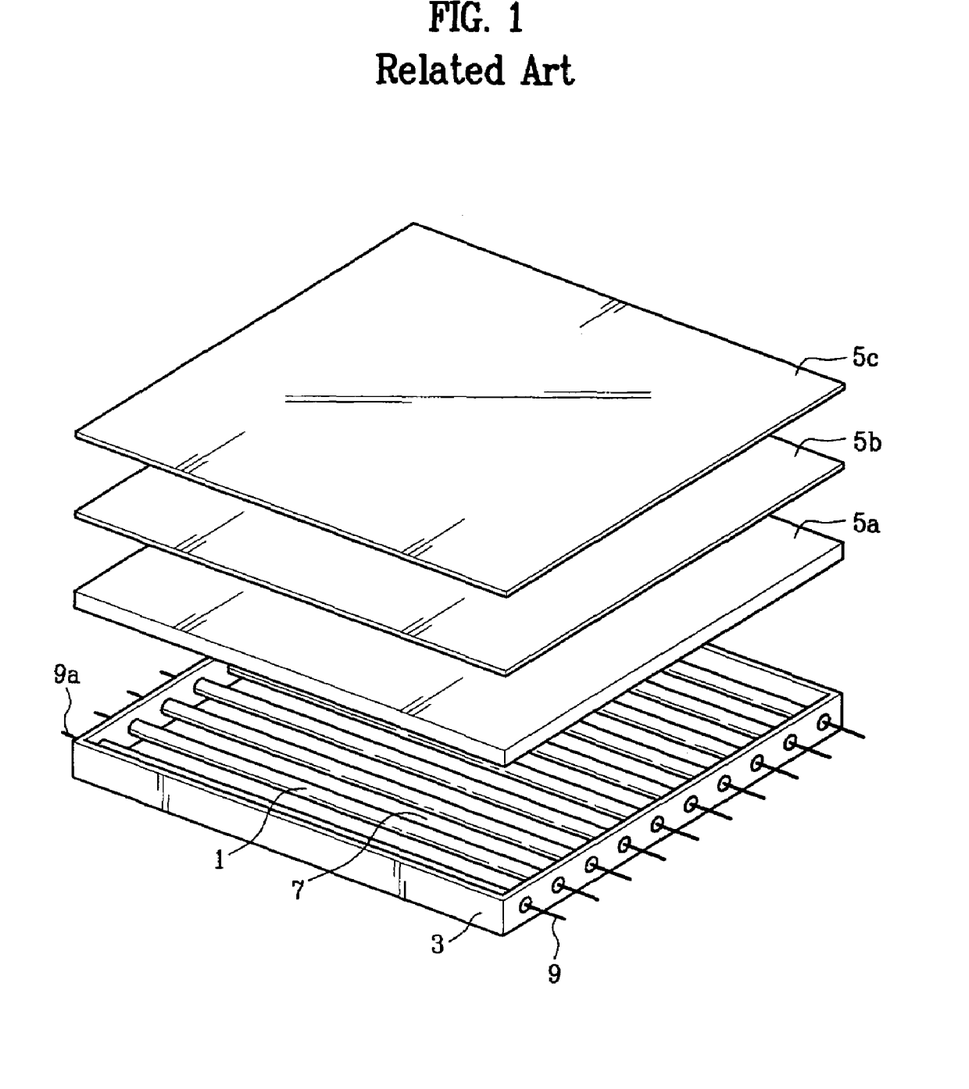
FIG. 1 is a perspective view illustrating the related art direct type backlight unit.
Figure 2:
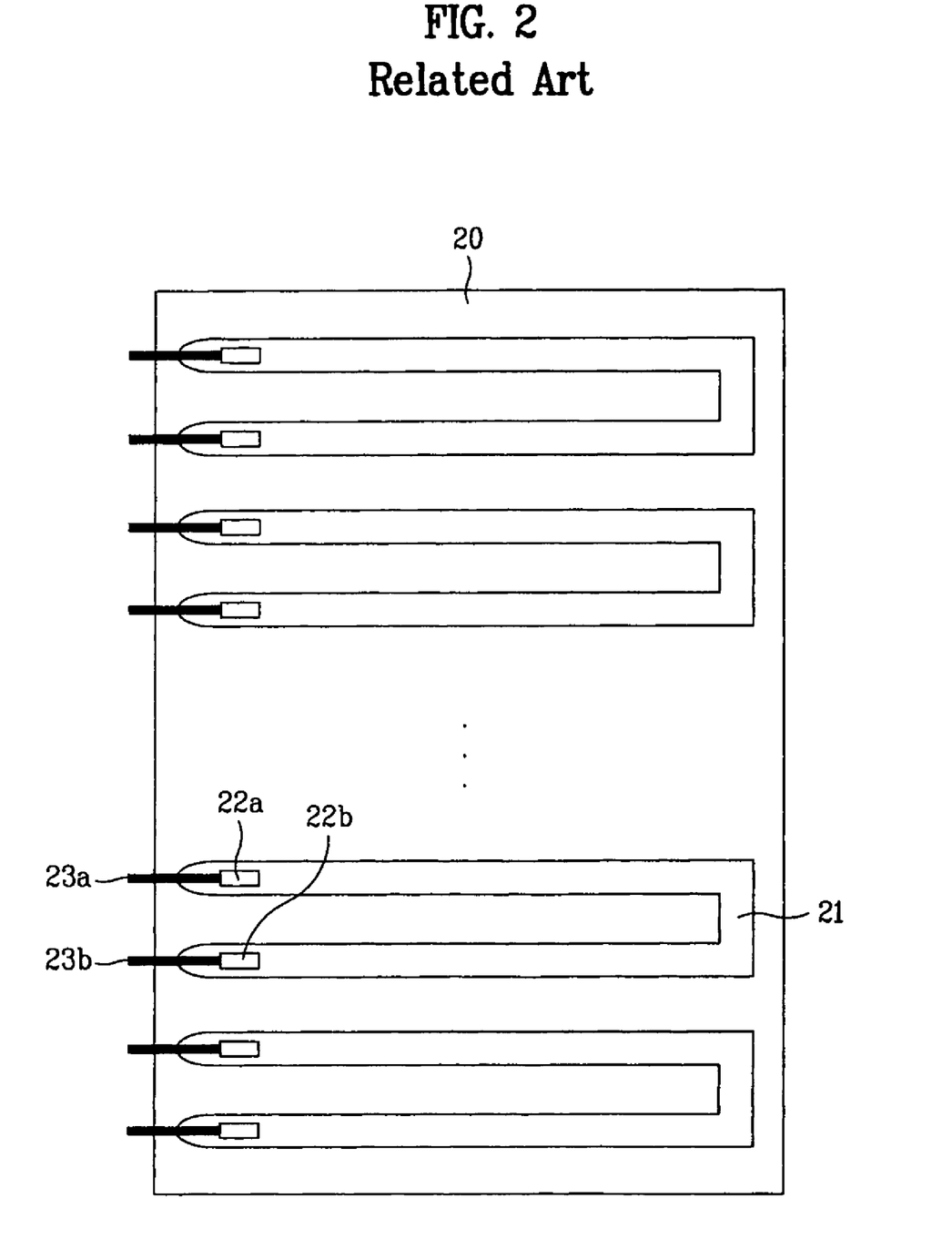
FIG. 2 is a plane view illustrating lamp arrangement of another related art direct type backlight unit.
Figure 3:
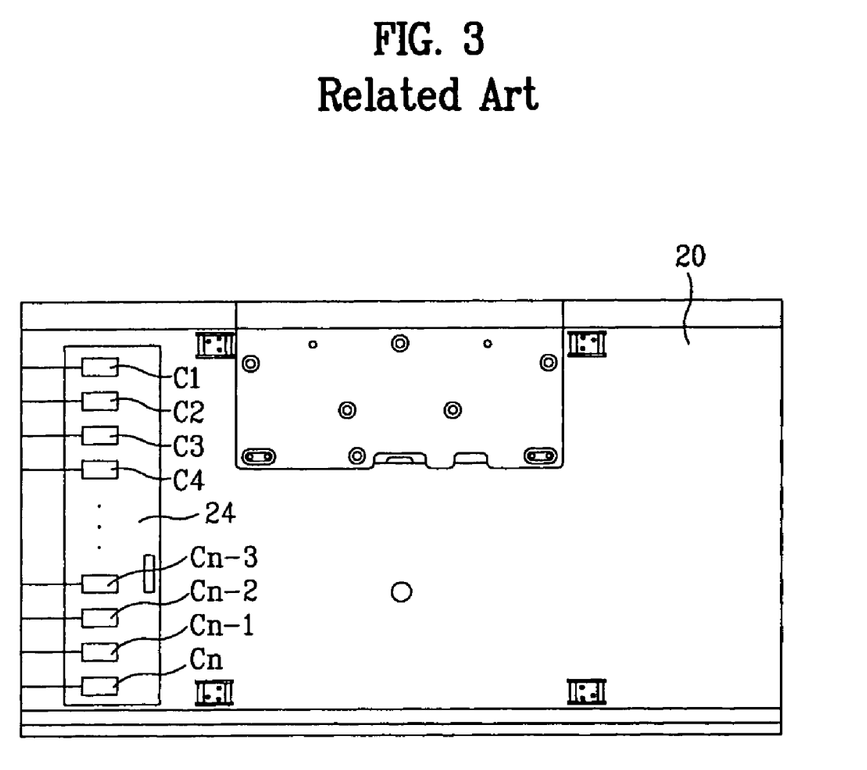
FIG. 3 is a rear view illustrating the related art direct type backlight unit of FIG. 2.

A related art direct type backlight unit will be described with reference to the accompanying drawings. FIG. 1 is a perspective view illustrating the related art direct type backlight unit, FIG. 2 is a plane view illustrating lamp arrangement of another related art direct type backlight unit, and FIG. 3 is a rear view illustrating the direct type backlight unit of FIG. 2.

As shown in FIG. 1, the related art direct type backlight unit includes a plurality of fluorescent lamps 1, an outer case 3, and light-scattering means 5a, 5b and 5c. The outer case 3 fixes and supports the fluorescent lamps 1. The light-scattering means 5a, 5b and 5c are provided between the fluorescent lamps 1 and an LCD panel (not shown). The light-scattering means 5a, 5b and 5c are used to prevent the silhouette of the fluorescent lamps 1 from being reflected on the display surface of the LCD panel, and to provide a light source with uniform luminance. To improve the light-scattering effect, there is a plurality of diffusion sheets and one diffusion plate is placed between the fluorescent lamps 1 and the LCD panel. In addition, a reflective sheet 7 is provided on an inner surface of the outer case 3 for reflecting the light emitted from the fluorescent lamps 1 to the display part of the LCD panel to improve light efficiency.

The fluorescent lamps 1 are formed of cold cathode fluorescent lamps (CCFLs). Specifically, electrodes are formed at both ends of a tube in each of the fluorescent lamps 1. Both ends of the fluorescent lamps 1 are respectively inserted to holes formed on both sides of the outer case 3. Then, electrodes of the fluorescent lamps 1 are connected with power lead-in lines 9a and 9b to supply voltages to the fluorescent lamps 1. The power lead-in lines 9a and 9b are also connected to a driving circuit by additional connector. Thus, each fluorescent lamp 1 requires an individual connector. Accordingly, when a voltage is applied to the electrodes of the fluorescent lamps 1, the fluorescent lamps 1 emit the light.

The power lead-in line 9 is connected to one electrode of the fluorescent lamp 1 and the power lead-in line 9a is connected to the other electrode of the fluorescent lamp 1. Both the power lead-in lines 9 and 9a are connected to a single connector. Therefore, since each one of the fluorescent lamps 1 requires the additional connector, the length of one of the power lead-in lines connected to the single connector may become longer. Thus, connection among the connectors and the power lead-in lines becomes complicated and the voltage may not be supplied to the fluorescent lamps.

Next, another related art backlight unit will be described. As shown in FIG. 2, a plurality of 'U' shaped cold cathode fluorescent lamps (CCFLs) 21 includes first and second electrodes 22a and 22b respectively formed inside an appropriate tube ends of the CCFLs 21. The CCFLs 21 are arranged on a lower structure 20 at constant intervals. The first and second power supply lines 23a and 23b are connected with the first and second electrodes 22a and 22b, respectively, to apply voltages to two electrodes. FIG. 3 shows an inverter 24 arranged on a rear surface of the lower structure 20 and includes a plurality of connectors C1, C2, . . . , Cn−3, Cn−2, Cn−1, Cn connected with the power supply lines of the CCFLs 21. A fluorescent layer is coated on inner surface of the CCFLs 21 and the CCFLs 21 are filled with Ar and Hg gases.

In the related art backlight unit described with respect to FIGS. 2 and 3, the connectors C1, C2, . . . , Cn of the inverter 24 are respectively connected to the first and second power supply lines 23a and 23b of each CCFL 21. If the lamps are arranged in a 'U' shape as shown in FIG. 2, the first and second power supply lines connected to a single connector have the same length, thus, the problem of the lengthy power lead-in lines can be solved. However, since the connectors are respectively connected to the first and second power supply lines (power lead-in lines), signals are output from the respective connectors simultaneously to drive the CCFLs simultaneously, therefore, signals output from the inverter increase. Accordingly, driving method for the CCFLs is still complicated.

SUMMARY OF THE INVENTION

Accordingly, the present invention is directed to a backlight unit that substantially obviates one or more problems due to limitations and disadvantages of the related art.

An object of the present invention is to provide a backlight unit that simplifies a structure for applying the power to the lamps.

Another object of the present invention is to provide a backlight unit that enables efficient parallel driving of 'U' shaped EEFLs.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit includes a case; a plurality of fluorescent lamps on the case, each fluorescent lamp having ends arranged in one direction, and having first and second electrodes provided at respective ends; a first power supply line connected with the first electrode; a second power supply line connected with the second electrode; a common electrode PCB arranged adjacent to the ends of the fluorescent lamps; a first common electrode on the common electrode PCB and connected with the first power supply line; a second common electrode on the common electrode PCB and connected with the second power supply line, the first and second common electrodes being spaced apart from each other; and an inverter to apply voltages to the first and second common electrodes.

In another aspect, a backlight unit, includes a case; a plurality of fluorescent lamps arranged symmetrically along a longitudinal center line on the case, the plurality of fluorescent lamps including first and second sets such that each fluorescent lamp of the first set has two ends arranged at a first side of the case with first and second electrodes respectively provided at the two ends and such that each fluorescent lamp of the second set has two ends arranged at a second side of the case with third and fourth electrodes respectively provided at the two ends; first to fourth power supply lines respectively connected with each one of the first to fourth electrodes; a first common electrode PCB arranged adjacent to the ends of the first set of the fluorescent lamps; a second common electrode PCB arranged adjacent to the ends of the second set of the fluorescent lamps; first and second common electrodes on the first common electrode PCB and respectively connected with the first and second power supply lines, the first and second common electrodes being spaced apart from each other; third and fourth common electrodes on the second common electrode PCB and respectively connected with the third and fourth power supply lines, the third and fourth common electrodes being spaced apart from each other; and first inverter to apply voltages to the first and second common electrodes and second inverters to apply voltages to the third and fourth common electrodes.

In another aspect, a backlight unit includes a case; a plurality of fluorescent lamps arranged on the case N sets of lamps in N areas of the case, each fluorescent lamp of the each of the N sets has two ends with first and second electrodes respectively provided at the two ends; N first and second power supply lines respectively connected with the first and second electrodes of the fluorescent lamps of each of the N sets; N common electrode PCBs respectively arranged adjacent to ends of corresponding ones of the N sets, each of the N common electrode PCBs having first and second common electrodes formed thereon spaced apart from each other and connected with corresponding ones of the N first and second power supply lines; first and second inverters to respectively apply power to the first and second electrodes of the fluorescent lamps of the N sets.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
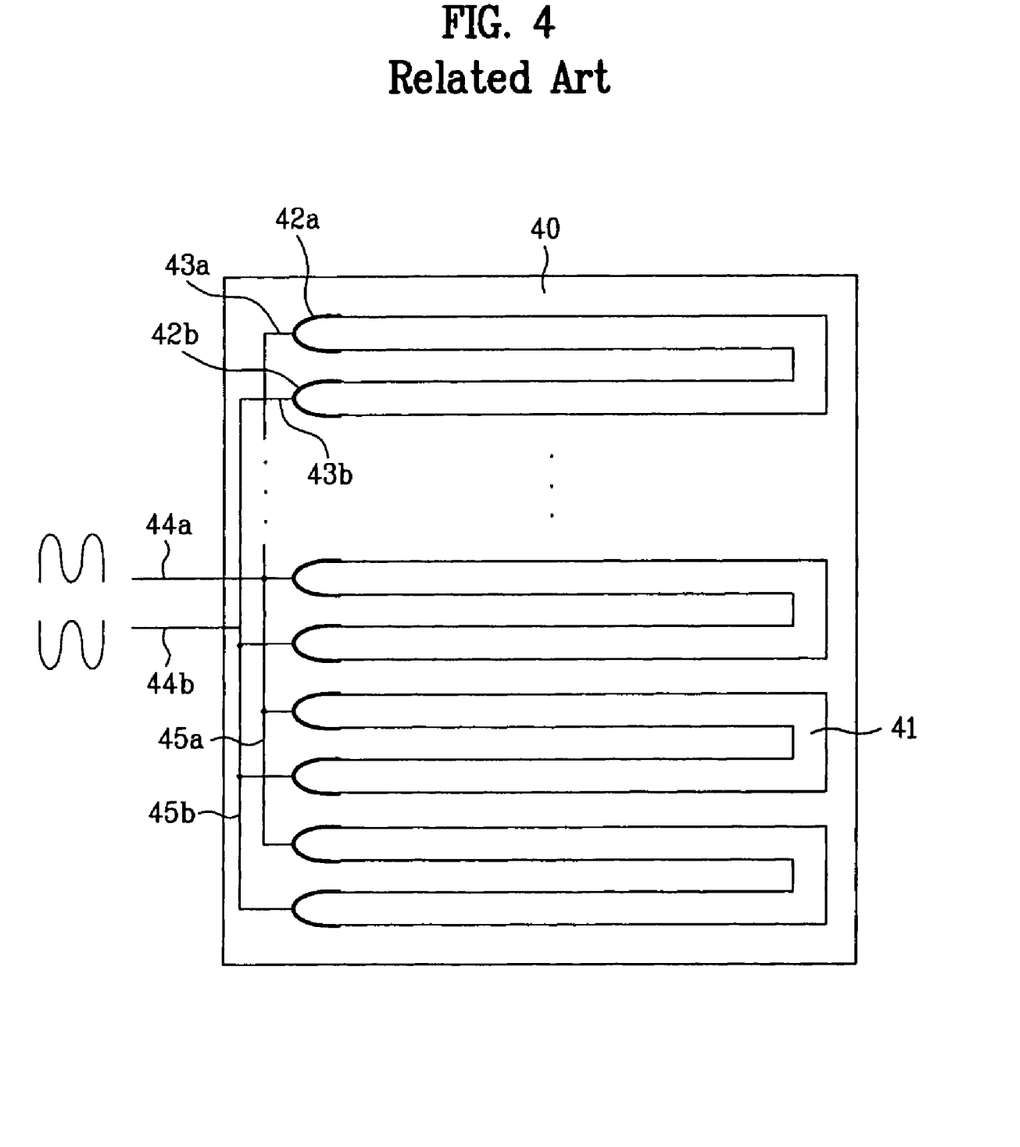
FIG. 4 is a plane view illustrating lamp arrangement of related art direct type backlight unit using 'U' shaped EEFLs.

As described earlier, in the related art backlight unit, connectors C1, C2, . . . , Cn of the inverter are respectively connected to first and second power supply lines of each 'U' shaped CCFL to drive the 'U' shaped CCFLs in parallel. Therefore, their driving mechanism is complicated. To simplify the related art driving mechanism, external electrode fluorescent lamps (EEFLs) having external electrodes at both ends of a fluorescent lamp tube are used. FIG. 4 describes the third related art backlight unit.

As shown in FIG. 4, a plurality of 'U' shaped fluorescent lamps 41 are arranged on a lower structure 40. The fluorescent lamps 41 are EEFLs that are provided with first and second external electrodes 42a and 42b at respective ends of the lamp. The first and second external electrodes 42a and 42b are arranged in one direction. The first external electrodes 42a of each fluorescent lamp 41 are connected with a first power supply line 43b and the second external electrodes 42b of each fluorescent lamp 41 are connected with a second power supply line 43b. First common electrode 45a is connected with first power supply line 43a and second common electrode 45b is connected with second power supply line 43b. The first and second common electrodes 45a and 45b are arranged spaced apart from each other having a constant interval to apply voltage to the first and second external electrode 42a and 42b.

In addition, the first and second common electrodes 45a and 45b are connected to first and second output terminals 44a and 44b of an inverter (not shown). The fluorescent lamps 41 provided with the first and second external electrodes adopt a high-high driving mode due to their high driving voltages. Voltages having opposite phases are applied to the first and second common electrodes 45a and 45b to drive the 'U' shaped fluorescent lamps 41 in parallel.

In the 'U' shaped fluorescent lamps 41, the second power supply lines 43b crosses the first common electrode 45a to be connected with the second common electrode 45b. Furthermore, the first output terminal 44a crosses the second common electrode 45b so that it can be connected to the inverter through the first common electrode 45a. When the power supply lines, the common electrodes, and the output terminals are arranged to cross one another, as shown in FIG. 4, it is difficult to drive the EEFLs with higher degree of stability. Accordingly, the present invention is directed to improve the stability of the backlight unit while driving the 'U' shaped EEFLs in parallel.

Next, a backlight unit according to the preferred embodiments of the present invention will be described with reference to the accompanying drawings.

Figure 5:
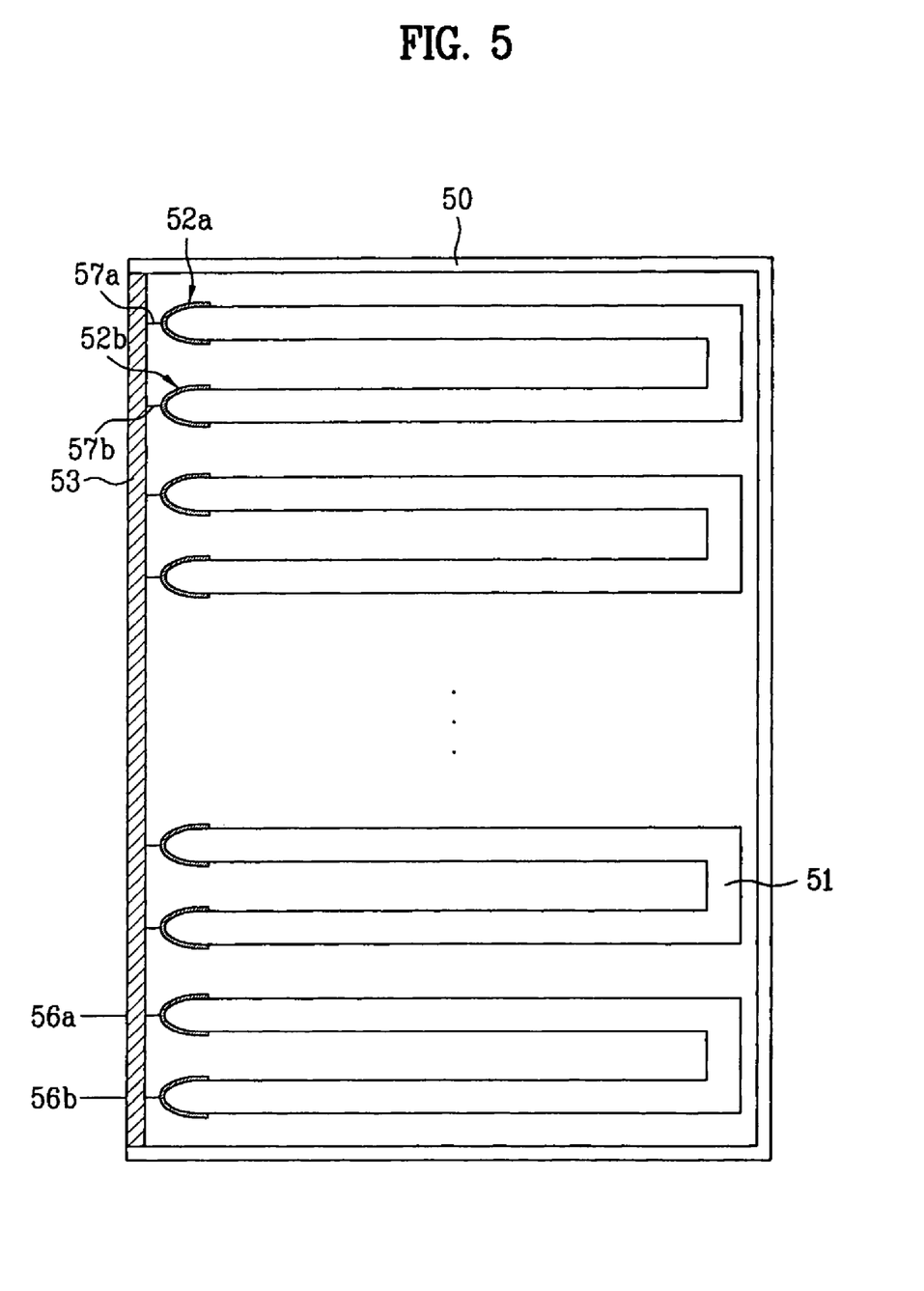
FIG. 5 is a plane view illustrating lamp arrangement of a direct type backlight unit for an LCD device according to first exemplary embodiment of the present invention.
Figure 6:
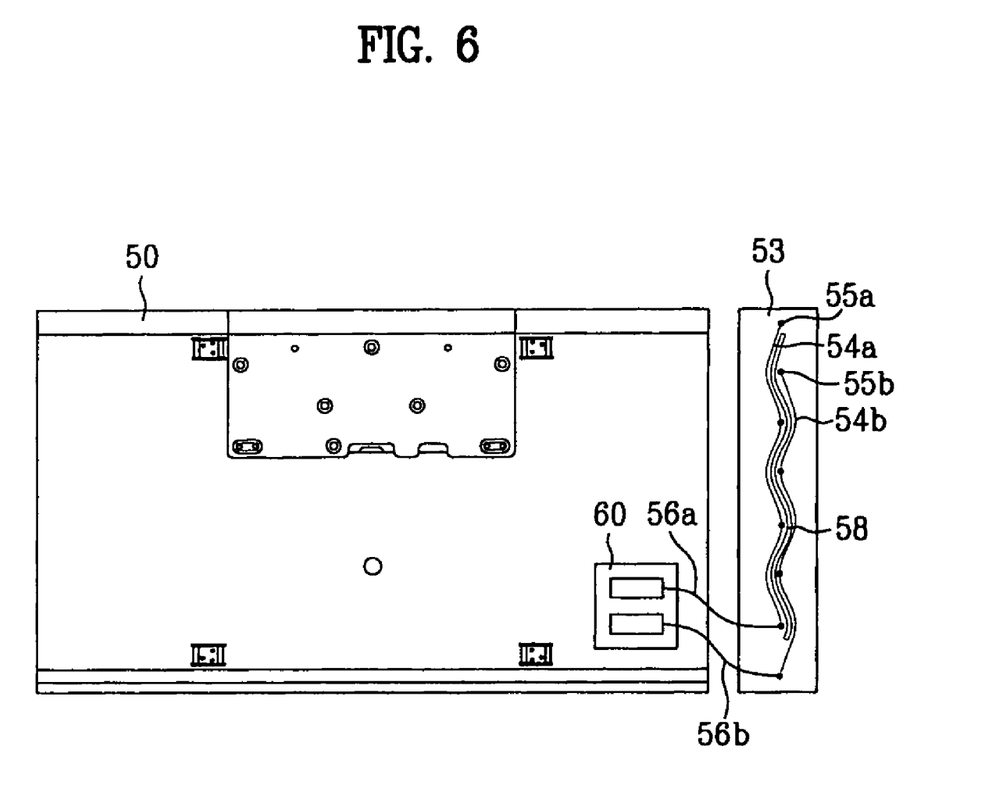
FIG. 6 illustrates a plane view of an exemplary common electrode printed circuit board (PCB) shown in FIG. 5 and a rear view of an exemplary direct type backlight unit of FIG. 5.

FIG. 5 is a plane view illustrating lamp arrangement of a direct type backlight unit for an LCD device according to first exemplary embodiment of the present invention. FIG. 6 illustrates a plane view of an exemplary common electrode PCB of FIG. 5 and a rear view of an exemplary direct type backlight unit of FIG. 5. As shown in FIG. 5, a plurality of fluorescent lamps 51 having 'U' shape are arranged on the outer case 50. The fluorescent lamps 51 are the external electrode fluorescent lamps (EEFLs).

Both ends of the 'U' shaped fluorescent lamps 51 are arranged in parallel and facing one direction, and first and second external electrodes 52a and 52b are formed outside respective tube ends of each fluorescent lamp 51. First and second power supply lines 57a and 57b are formed at corresponding ends of the fluorescent lamps 51 so that they are connected to the first and second external electrodes 52a and 52b, respectively. The first and second power supply lines 57a and 57b are extracted before the fluorescent lamps 51 are taped by winding an aluminum foil that has conductivity. Therefore, the first and second power supply lines 57a and 57b are respectively connected to the first and second external electrodes 52a and 52b at corresponding ends of each fluorescent lamp 51.

A first common electrode PCB 53 is arranged at one side of the outer case 50 adjacent to the tube ends of the fluorescent lamps 51, and serves to apply the power to both ends of each fluorescent lamp 51. As shown in FIG. 6, the first common electrode PCB 53 is arranged between the first and second external electrodes 52a and 52b of each fluorescent lamp 51 and a first inverter 60. In addition, the first common electrode PCB 53 is provided with a plurality of first and second contact points 55a and 55b that correspond to particular tube ends of the fluorescent lamps 51. The first contact points 55a are arranged at odd numbered positions and the second contact points 55b are arranged at even numbered positions.

A first common electrode 54a is arranged to connect the first contact points 55a and a second common electrode 54b is arranged to connect the second contact points 55b. First and second common voltage input lines 56a and 56b connect to the first and second common electrode 54a and 54b through particular one of the first and second contact points 55a and 55b, respectively. These particular contact points are located at one end of the first and second common electrodes 54a and 54b. In addition, the first and second common voltage lines 56a and 56b extend toward the rear surface of the outer case 50. Furthermore, the first and second common voltage input lines 56a and 56b are connected to an inverter 60, and the first and second power supply lines 57a and 57b are respectively connected to the first and second contact points 55a and 55b by soldering. The first and second common electrodes 54a and 54b are made of conductive material, arranged spaced apart from each other, and each having a curved shape.

As shown in FIG. 6, a slit 58 is formed between the first and second common electrodes 54a and 54b to prevent short between the first and second common electrodes 54a and 54b. Instead of forming the slit, surfaces of the first and second common electrodes 54a and 54b may be treated with silk (not shown). The silk treatment may be performed by applying a non-conductive white dye onto each surface of the first and second common electrodes 54a and 54b. The slit or the silk treatment is performed to prevent short between the first and second common electrodes 54a and 54b. Furthermore, it prevents spark between the two common electrodes due to the differences in the driving voltages applied to the first and second external electrodes 52a and 52b while driving in the high-high driving mode.

The first inverter 60 is arranged at one portion on the rear surface of the outer case 50 that is closer to the first common electrode PCB 53. The first inverter 60 applies voltages to the first and second common electrodes 54a and 54b through the first and second common voltage input lines 56a and 56b. Accordingly, driving the 'U' shaped fluorescent lamps in parallel is achieved in such a manner that the first and second common electrodes 54a and 54b are arranged on the first common electrode PCB 53, and the first and second power supply lines 57a and 57b are connected with the first and second common electrodes 54a and 54b. In this case, the first and second power supply lines 57a and 57b are connected respectively with the first and second external electrodes 52a and 52b at appropriate ends of each fluorescent lamp 51.

In addition to the EEFLs, 'U' shaped CCFLs may be used as the fluorescent lamps. The 'U' shaped CCFLs are provided with first and second power lead-in lines connected with the first and second electrodes. Each electrode is respectively formed inside an appropriate tube end of the fluorescent lamps. If the 'U' shaped CCFLs are provided, the first common electrode PCB and elements formed thereon are almost the same as those of the backlight unit based on the EEFLs. However, in case of the CCFLs, the first and second power supply lines 57a and 57b are not required because the first and second power lead-in lines are provided in the first and second electrodes formed inside the tube ends of the fluorescent lamps. In the case of first exemplary embodiment, the first and second power lead-in lines are connected to the first and second contact points 55a and 55b by soldering. Accordingly, the 'U' shaped CCFLs as described above can be run in parallel with a greater degree of stability.

Although the 'U' shaped fluorescent lamps have been described, various shaped fluorescent lamps may be provided. For example, fluorescent lamps having the both tube ends of the fluorescent lamp arranged to face one direction, may be provided. Such alternative fluorescent lamps is not limited to the first exemplary embodiment only, but may be used for additional exemplary embodiments of the present invention.

Figure 7:
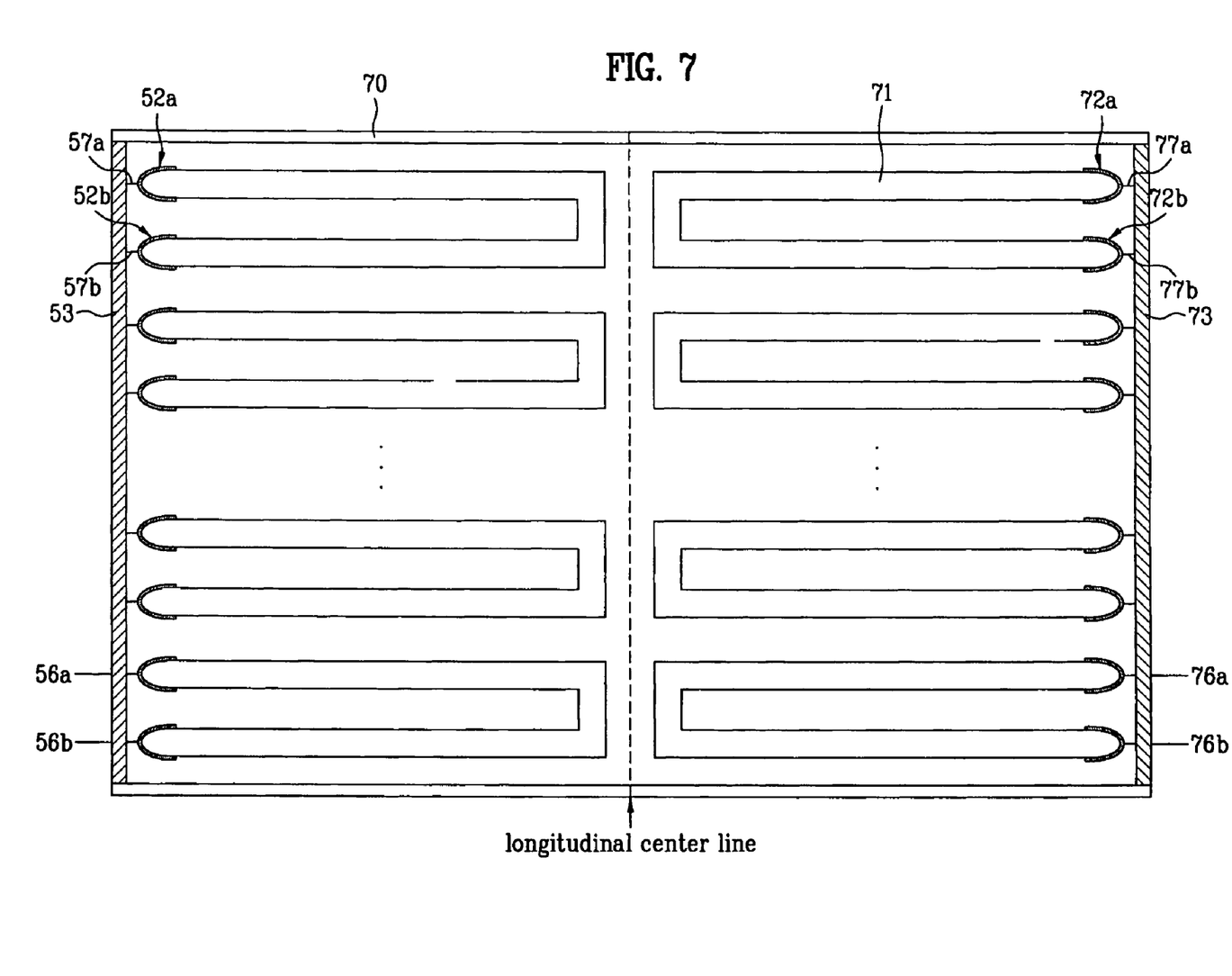
FIG. 7 is a plane view illustrating lamp arrangement of a direct type backlight unit for an LCD device according to second exemplary embodiment of the present invention.
Figure 8:
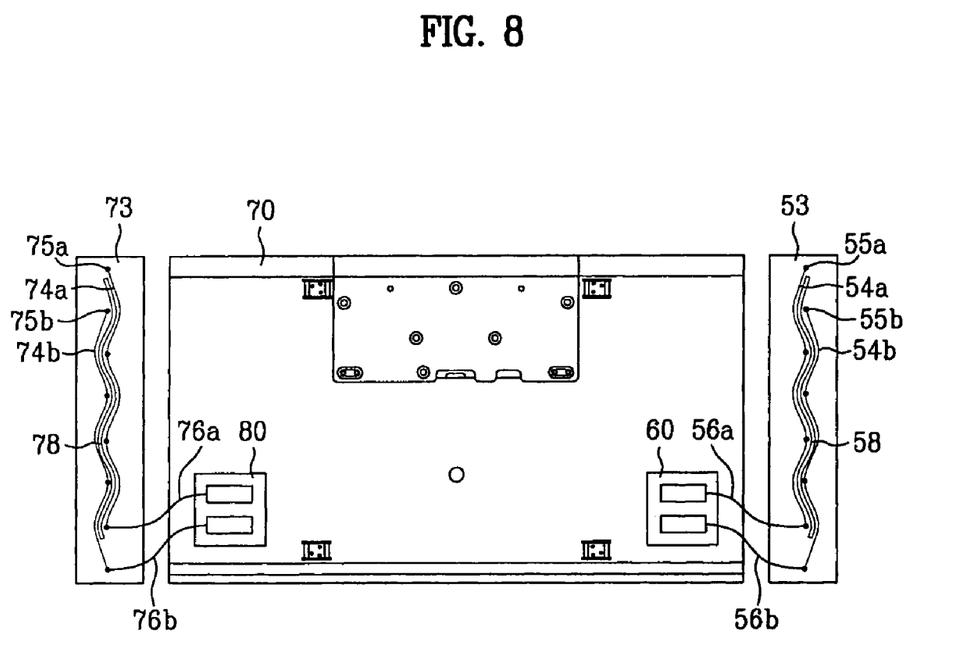
FIG. 8 illustrates a plane view of an exemplary common electrode PCB shown in FIG. 7 and a rear view of an exemplary direct type backlight unit of FIG. 7.

FIG. 7 is a plane view illustrating lamp arrangement of a direct type backlight unit for an LCD device according to the second exemplary embodiment of the present invention. FIG. 8 illustrates a plane view of an exemplary common electrode PCB of FIG. 7 and a rear view of an exemplary direct type backlight unit of FIG. 7. In the backlight unit according to the second embodiment of the present invention, the whole screen is divided into two equal portions. And, a plurality of fluorescent lamps 51 and 71 having 'U' shape are symmetrically arranged along a longitudinal center line. At this time, the fluorescent lamps 51 and 71 are the external electrode fluorescent lamps (EEFLs).

As sown in FIG. 7, the fluorescent lamps 51 are arranged in the left side portion and the fluorescent lamps 71 are arranged in the right side portion. Ends of each fluorescent lamp 51 are arranged to face left edge of the screen and ends of each fluorescent lamp 71 are arranged to face right edge of the screen. The reference numbers in FIG. 7 with respect to the fluorescent lamp 51 correspond to the like elements of FIG. 5. Accordingly, a description for the like elements having similar features is omitted. With respect to the fluorescent lamps 71, third and fourth external electrodes 72a and 72b are formed outside respective tube ends of each fluorescent lamp 71. Third and fourth power supply lines 77a and 77b are formed at corresponding ends of the fluorescent lamps 71 so that they are respectively connected to the third and fourth external electrodes 72a and 72b.

The first to fourth power supply lines 57a, 57b, 77a, and 77b are extracted before the fluorescent lamps 51 and 71 are taped, so that they are respectively connected to the first to fourth external electrodes 52a, 52b, 72a, and 72b at corresponding ends of the fluorescent lamps 51 and 71. At this time, the fluorescent lamps 51 and 71 are taped by winding an aluminum foil that has conductivity. First and second common electrode PCBs 53 and 73 are arranged at left and right side of the outer case 70 adjacent to the tube ends of the fluorescent lamps 51 and 71, and serves to apply voltages to both ends of the fluorescent lamps 51 and 71.

As shown in FIG. 8, the first and second common electrodes PCB 53 and PCB 73 are arranged between the corresponding external electrodes and first and second inverters 60 and 80, respectively. The first and second common electrode PCBs 53 and 73 are provided with a plurality of first and third contact points 55a and 75a and a plurality of second and fourth contact points 55b and 75b. These contact points 55a, 55b, 75a, and 75b correspond to particular tube ends of the fluorescent lamps 51 and 71. The first and third contact points 55a and 75a are arranged at odd numbered positions and the second and fourth contact points 55b and 75b are arranged at even numbered positions.

Third common electrode 74a is arranged to connect the third contact points 75a and fourth common electrode 74b is arranged to connect the fourth contact points 75b. Third and fourth common voltage input lines 76a and 76b connect to the third and fourth common electrodes 74a and 74b through particular one of the third and fourth contact points 75a and 75b, respectively. These particular contact points are located at one end of the third and fourth common electrodes 74a and 74b. In addition, the third and fourth common voltage lines 76a and 76b extend toward the rear surface of the outer case 70. Furthermore the third and fourth common voltage input lines 76a and 76b connect to the inverter 80, and the third and fourth power supply lines 77a and 77b are respectively connected to the third and fourth contact points 75a and 75b by soldering. The third and fourth common electrodes 74a and 74b are made of conductive material, arranged spaced apart from each other, and each having a curved shape.

Two slits 58 and 78 are formed between the two common electrodes 54a and 54b and 74a and 74b to avoid short between the two common electrodes. Instead of forming the slits, although not shown, surfaces of the first to fourth common electrodes 54a, 54b, 74a, and 74b may be treated with silk. As described earlier in reference to the first exemplary embodiment, the silk treatment may be performed by applying a non-conductive white dye onto surface of each of the first to fourth common electrodes 54a, 54b, 74a and 74b. In addition to preventing short between the two common electrodes, the slit or the silk treatment is performed to prevent spark. The spark may appear between the respective common electrodes due to the differences in the driving voltages applied to the first and second external electrodes 52a and 52b and the third and fourth external electrodes 72a and 72b while driving in the high-high driving mode.

The first and second inverters 60 and 80 are arranged on the rear surface of the outer case 70 at portions closer to respective first and second common electrodes PCB 53 and PCB 73. For example, the first inverter 60 is arranged left side of the rear surface and the second inverter 80 is arranged at right side of the rear surface. The first inverter 60 applies voltages to the first and second common electrodes 54a and 54b through the first and second common voltage input lines 56a and 56b. Also, the second inverter applies voltages to the third and fourth common electrodes 74a and 74b through the third and fourth common voltage input lines 76a and 76b. Accordingly, driving the 'U' shaped fluorescent lamps 51 and 71 in parallel is achieved provided that the first to fourth common electrodes 54a, 54b, 74a, and 74b are respectively arranged on the first and second common electrode PCB 53 and PCB 74, and the first to fourth power supply lines 57a, 57b, 74a, and 74b are connected with the corresponding first to fourth common electrodes 54a, 54b, 74a, and 74b. In this case, the first to fourth power supply lines 57a, 57b, 77a, and 77b are connected respectively with the first to fourth external electrodes 52a, 52b, 72a, and 72b at appropriate ends of fluorescent lamps 51 and 71.

In addition to the EEFLs, 'U' shaped CCFLs may be used as the fluorescent lamps. As described earlier, the 'U' shaped CCFLs are provide with the power lead-in lines, each connected with an appropriate one of the plurality of electrodes. In addition, each electrode is respectively formed inside an appropriate tube end of the fluorescent lamps. Furthermore, when the 'U' shaped CCFLs are provided, the first and second common electrodes PCBs and elements formed thereon are almost the same as those of the EEFLs backlight unit. While the EEFLs require the common power supply lines between the inverter and the common electrodes, such common power supply lines are not required for the 'U' shaped CCFLs because the power lead-in lines are provided in the electrodes formed inside the tube ends of the fluorescent lamps. In the case of second exemplary embodiment, the first to fourth power lead-in lines are connected respectively with the first to fourth contact points by soldering.

Figure 9:
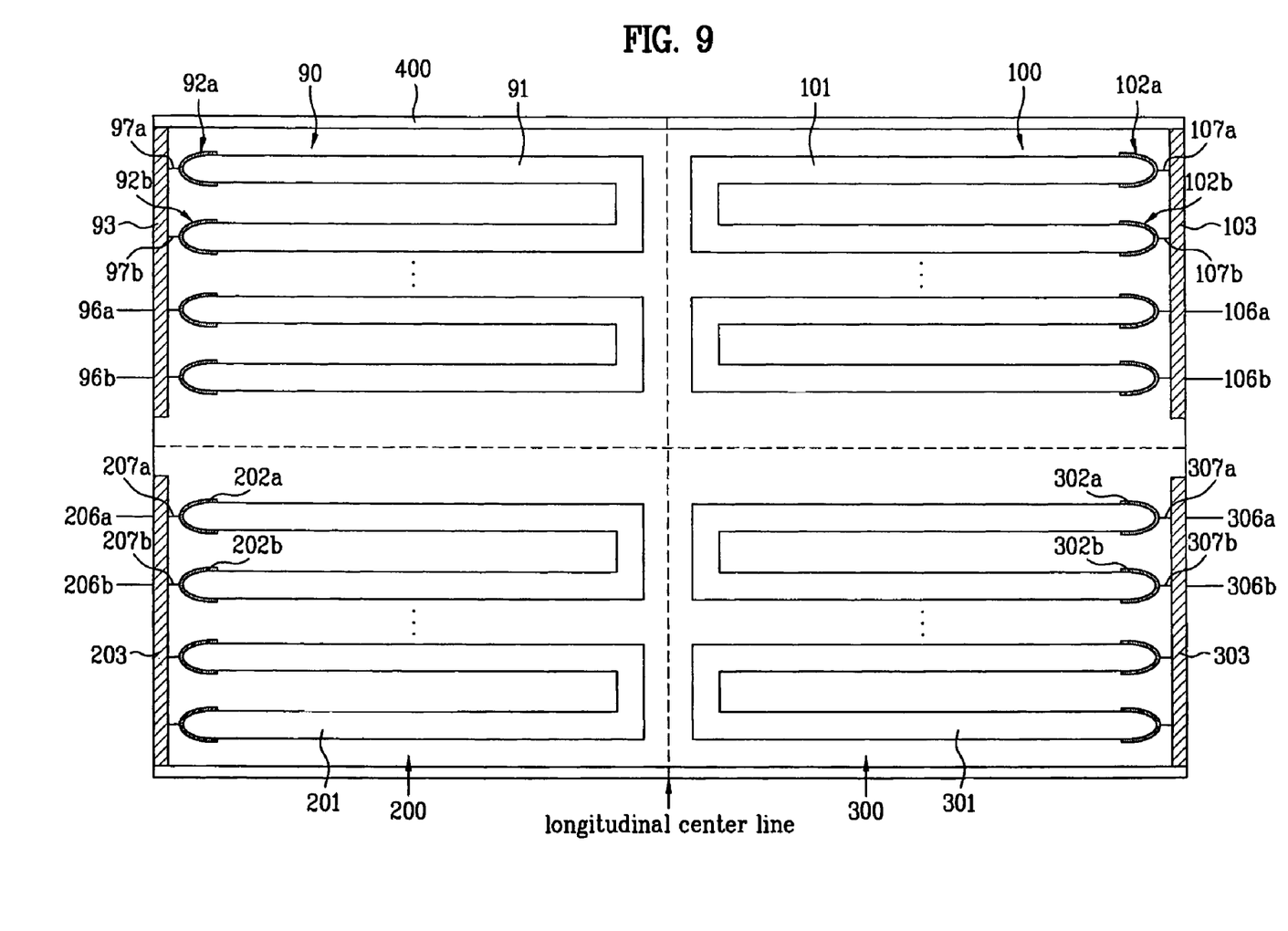
FIG. 9 is a plane view illustrating lamp arrangement of a direct type backlight unit for an LCD device according to third exemplary embodiment of the present invention.
Figure 10:
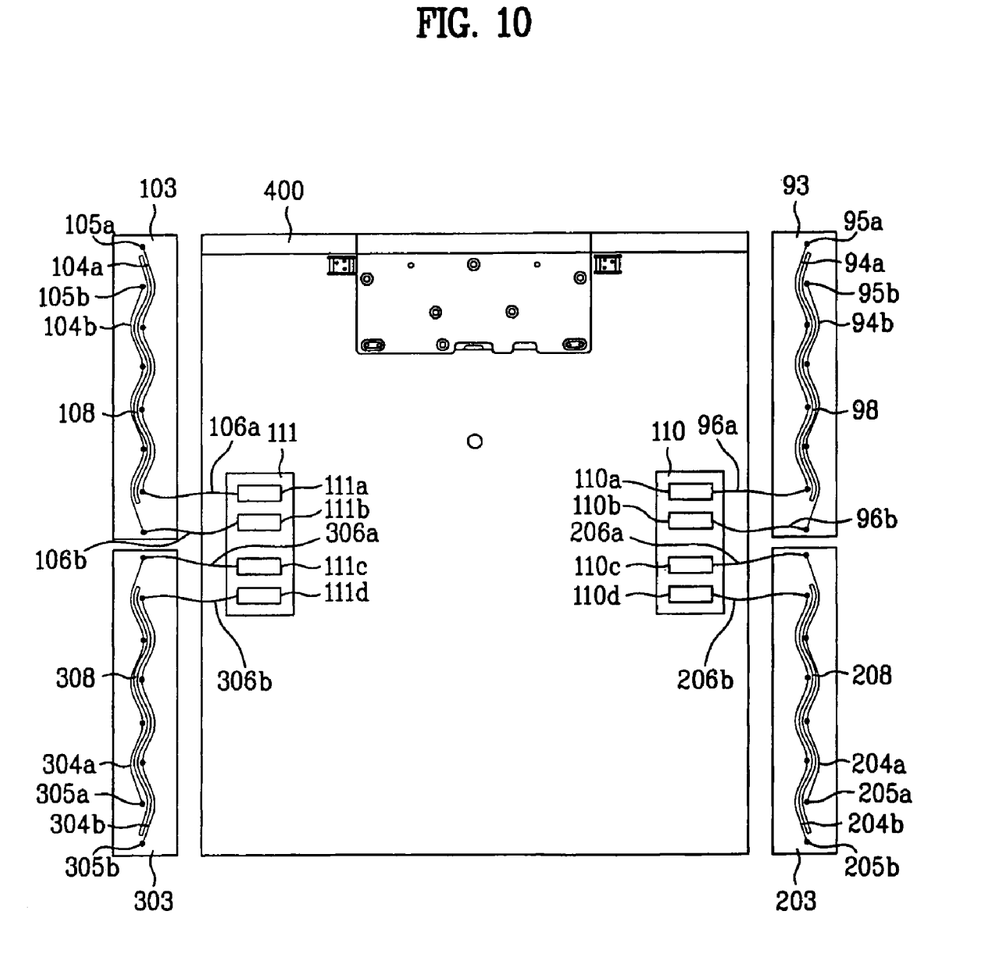
FIG. 10 illustrates a plane view of an exemplary common electrode PCB shown in FIG. 9 and a rear view of an exemplary direct type backlight unit of FIG. 9.

FIG. 9 is a plane view illustrating lamp arrangement of a direct type backlight unit for an LCD device according to the third exemplary embodiment of the present invention. FIG. 10 illustrates a plane view of an exemplary common electrode PCB of FIG. 9 and a rear view of an exemplary direct type backlight unit of FIG. 9. In the backlight unit according to the third exemplary embodiment of the present invention, the whole screen is divided into N divisional areas, and a plurality of fluorescent lamps are provided in each divisional areas such that both ends of each fluorescent lamp are arranged to face one direction. Common electrode PCBs are provided at a side that faces the ends of each fluorescent lamp. Each common electrode PCB is provided with two common electrodes that are arranged spaced apart from each other having a constant interval. In addition, two inverters are arranged on the rear surface of the outer case in order to apply the power to the fluorescent lamps.

As shown in FIGS. 9 and 10, the whole screen is symmetrically divided along a longitudinal center line and a horizontal line into first to fourth divisional areas 90, 100, 200 and 300. First to fourth fluorescent lamps 91, 101, 201, and 301 having 'U' shape are symmetrically arranged in the first to fourth divisional areas on the outer case 400. At this time, the first to fourth fluorescent lamps 91, 101, 201, and 301 are the external electrode fluorescent lamps (EEFLs). Although, reference numbers assigned to the elements of FIGS. 9 and 10 are different from those shown in FIGS. 5, 6, 7, and 8, a description for the corresponding elements having the similar features is omitted.

In the first divisional area 90, 91 denotes 'U' shaped first fluorescent lamps, 92a and 92b denotes first and second external electrodes, respectively, 93 denotes first common electrode PCB, 94a and 94b respectively denotes first and second common electrodes and are made of conductive material, 95a and 95b denotes first and second contact points, respectively, 96a and 96b denotes first and second common voltage input lines, respectively, 97a and 97b denotes first and second power supply lines, respectively, and 98 denotes a first slit.

Similarly, in the second divisional area 100, 101 denotes 'U' shaped second fluorescent lamps, 102a and 102b denotes third and fourth external electrodes, respectively, 103 denotes second common electrode PCB, 104a and 104b respectively denotes third and fourth common electrodes and are made of conductive material, 105a and 105b denotes third and fourth contact points, respectively, 106a and 106b denotes third and fourth common voltage input lines, respectively, 107a and 107b denotes third and fourth power supply lines, respectively, and 108 denotes a second slit.

In addition, in the third divisional area 200, 201 denotes 'U' shaped third fluorescent lamps, 202a and 202b denotes fifth and sixth external electrodes, respectively, 203 denotes third common electrode PCB, 204a and 204b respectively denotes fifth and sixth common electrodes and are made of conductive material, 205a and 205b denotes fifth and sixth contact points, respectively, 206a and 206b denotes fifth and sixth common voltage input lines, respectively, 207a and 207b denotes fifth and sixth power supply lines, respectively, and 208 denotes a third slit.

Furthermore, in the fourth divisional area 300, 301 denotes 'U' shaped fourth fluorescent lamps, 302a and 302b denotes seventh and eighth external electrodes, respectively, 303 denotes fourth common electrode PCB, 304a and 304b respectively denotes seventh and eighth common electrodes and are made of conductive material, 305a and 305b denotes seventh and eighth contact points, respectively, 306a and 306b denotes seventh and eighth common voltage input lines, respectively, 307a and 307b denotes seventh and eighth power supply lines, respectively, and 308 denotes a fourth slit.

As shown in FIG. 9, in the first and third divisional areas 90 and 200, the ends of the 'U' shaped first and third fluorescent lamps 91 and 201 are arranged to face left edge of the outer case 400. On the other hand, in the second and fourth divisional areas 100 and 300, the ends of the 'U' shaped second and fourth fluorescent lamps 101 and 301 are arranged to face right edge of the outer case 400.

As shown in FIG. 10, the first and third common voltage input lines 96a and 206a connect to the first and fifth common electrodes 94a and 204a through particular one of the first and fifth contact points 95a and 105a, respectively. These particular contact points are located at one end of the first and fifth common electrodes 94a and 204a. Similarly, the second and sixth common voltage input lines 96b and 206b conned to the second and sixth common electrodes 94b and 204b through particular one of the second and sixth contact points 95b and 205b, respectively. These particular contact points are located at one end of the second and sixth common electrodes 94b and 204b.

In addition, the third and seventh common voltage input lines 106a and 306a connect to the third and seventh common electrodes 104a and 304a through particular one of the third and seventh contact points 105a and 305a, respectively. These particular contact points are located at one end of the third and seventh common electrodes 104a and 304a. Similarly, the fourth and eighth common voltage input lines 106b and 306b conned to the fourth and eighth common electrodes 104b and 304b through particular one of the fourth and eighth contact points 105b and 305b, respectively. These particular contact points are located at one end of the fourth and eighth common electrodes 104b and 304b. The plurality of contact points provided on each of the common electrode PCBs correspond to the particular ends of the fluorescent lamps in the respective divisional area. The common voltage input lines all extend toward the rear surface of the outer case 400.

As shown in FIG. 10, first inverter 110 is arranged on right side of the rear surface of the outer case 400. The first inverter 110 includes first to fourth transformers, 110a to 110d. The first transformer 110a connects to the first common voltage input line 96a and further connects to the first common electrode 94a to apply voltages to the first common electrode 94a. Similarly, the second transformer 110b connects to the second common voltage input line 96b and further connects to the second common electrode 94b to apply voltages to the second common electrode 94b. Likewise, the third transformer 110c connects to the fifth common voltage input line 206a and further connects to the fifth common electrode 204a to apply voltages to the fifth common electrode 204a. In addition, the fourth transformer 110d connects to the sixth common voltage input line 206b and further connects to the sixth common electrode 204b to apply voltages to the sixth common electrode 204b.

Furthermore, second inverter 111 is arranged on left side of the rear surface of the outer case 400. The second inverter 111 includes fifth to eighth transformers, 111a to 111d. The fifth to eighth transformers 111a to 111d connect to the respective one of third, fourth, seventh, and eighth common voltage input lines 106a, 106b, 306a, and 306b. The transformers of the second inverter function similar to the transformers of the first inverter 110. Therefore, a description for the corresponding elements having the similar features is omitted.

As described above with reference to the first inverter 110, the fluorescent lamps of the first and third divisional areas 90 and 200 are run by the control of the transformers 110a-110d provided in the first inverter 110. Likewise, the fluorescent lamps of the second and fourth divisional areas 100 and 300 are run by the control of the transformers 111a-111d provided in the second inverter 111. Accordingly, single inverter (either 110 or 111) can drive two divisional areas (i.e., 90 and 200 or 100 and 300), in which two divisional areas may be selected based on their distribution map (i.e., 90 and 200 are located on left side of screen, etc.).

In the third exemplary embodiment of the present invention, backlight unit is divided into four divisional areas such that each of the four divisional areas may be independently run by the control of the first to fourth transformers of the first inverter 110 and fifth to eighth transformers of the second inverter 111. In addition, the division is not limited to four, but the backlight unit may be divided into N divisional areas.

Furthermore, the EEFLs may be replaced by 'U' shaped CCFLs. In reference to the first and second exemplary embodiments of the present invention, the 'U' shaped CCFLs are provide with the power lead-in lines, each connected with an appropriate one of the plurality of electrodes. In addition, each electrode is respectively formed inside an appropriate tube end of the fluorescent lamps. When the 'U' shaped CCFLs are provided, the common electrodes PCBs and elements formed thereon are almost the same as those of the EEFLs base backlight unit. While the EEFLs require the common power supply lines between the inverter and the common electrodes, such common power supply lines are not required for the 'U' shaped CCFLs because the power lead-in lines are provided in the electrodes formed inside the tube ends of the fluorescent lamps. In the case of third exemplary embodiment, the first to eighth power lead-in lines are connected respectively with the first to eighth contact points by soldering.

As described above, the backlight unit according to the present invention has the following advantages. First, the high voltage lines for driving the 'U' shaped fluorescent lamps can be arranged in parallel and the common electrodes can be formed on the common electrodes PCBs. Thus, the power lines do not have to cross each other. Accordingly, the level of stability can be improved while driving the fluorescent lamps. In addition, when the 'U' shaped fluorescent lamps are arranged in each divisional area, a common electrode PCB dedicated to a given visional area is provided such that each dedicated PCB has the two common electrodes and two common electrodes are arranged spaced apart from each other. Thus, the 'U' shaped fluorescent lamps can be arranged in each divisional area, and the fluorescent lamps in each divisional area may be run independently.

It will be apparent to those skilled in the art that various modifications and variations can be made in the backlight unit of the present invention without departing from the spirit or scope of the inventions. Thus, it is intended that the present invention cover the modifications and variations of this invention provided they come within the scope of the appended claims and their equivalents.

What is claimed is:

1. A backlight unit, comprising:
   a case;
   a plurality of fluorescent lamps on the case, each fluorescent lamp having ends arranged in one direction, and having first and second electrodes provided at respective ends;
   a first power supply line connected with the first electrode;
   a second power supply line connected with the second electrode;
   a common electrode PCB arranged adjacent to the ends of the fluorescent lamps;
   a first common electrode on the common electrode PCB and connected with the first power supply line;
   a second common electrode on the common electrode PCB and connected with the second power supply line, the first and second common electrodes being spaced apart from each other; and
   an inverter to apply voltages to the first and second common electrodes.

2. The backlight unit as claimed in claim 1, wherein the fluorescent lamps have a 'U' shape.

3. The backlight unit as claimed in claim 1, wherein the common electrode PCB is provided with a plurality of first and second contact points that correspond to the respective ends of the fluorescent lamps, the first power supply lines connect to the first common electrode through the plurality of first contact points, and the second power supply lines connect to the second common electrode through the plurality of second contact points.

4. The backlight unit as claimed in claim 1, wherein the first and second power supply lines are respectively connected with the first and second electrodes by winding a foil that has a conductivity before the fluorescent lamps are taped.

5. The backlight unit as claimed in claim 1, wherein each of the first and second common electrodes are respectively provided with first and second common voltage input lines at one end, and the first and second common voltage input lines extend to connect to the inverter.

6. The backlight unit as claimed in claim 3, wherein the first and second power supply lines are respectively connected with the first and second contact points by soldering.

7. The backlight unit as claimed in claim 1, wherein the first and second common electrodes have a curbed shape.

8. The backlight unit as claimed in claim 1, wherein the first and second common electrodes are made of a conductive material.

9. The backlight unit as claimed in claim 7, wherein the first and second common electrodes are provided with a slit formed therebetween.

10. The backlight unit as claimed in claim 1, wherein surfaces of the first and second common electrodes are treated with silk.

11. The backlight unit as claimed in claim 10, wherein silk treatment is performed by applying a non-conductive white dye onto each surface of the first and second common electrodes.

12. The backlight unit as claimed in claim 1, wherein the fluorescent lamps are external electrode fluorescent lamps, wherein electrodes are formed outside both ends of the fluorescent lamps.

13. The backlight unit as claimed in claim 1, wherein the fluorescent lamps are cold cathode fluorescent lamps, and the first and second electrodes are formed inside both ends of the fluorescent lamps.

14. The backlight unit as claimed in claim 13, wherein the first and second power supply lines are respectively replaced with first and second power lead-in lines connected with respective one of the first and second electrodes.

15. A backlight unit, comprising:
a case;
a plurality of fluorescent lamps arranged symmetrically along a longitudinal center line on the case, the plurality of fluorescent lamps including first and second sets such that each fluorescent lamp of the first set has two ends arranged at a first side of the case with first and second electrodes respectively provided at the two ends and such that each fluorescent lamp of the second set has two ends arranged at a second side of the case with third and fourth electrodes respectively provided at the two ends;
first to fourth power supply lines respectively connected with each one of the first to fourth electrodes;
a first common electrode PCB arranged adjacent to the ends of the first set of the fluorescent lamps;
a second common electrode PCB arranged adjacent to the ends of the second set of the fluorescent lamps;
first and second common electrodes on the first common electrode PCB and respectively connected with the first and second power supply lines, the first and second common electrodes being spaced apart from each other;
third and fourth common electrodes on the second common electrode PCB and respectively connected with the third and fourth power supply lines, the third and fourth common electrodes being spaced apart from each other; and
first inverter to apply voltages to the first and second common electrodes and second inverters to apply voltages to the third and fourth common electrodes.

16. The backlight unit as claimed in claim 15, wherein the first common electrode PCB is provided with a plurality of first and second contact points that correspond to the respective ends of the fluorescent lamps of first set, and the second common electrode PCB is provided with a plurality of third and fourth contact points that correspond to the respective ends of the fluorescent lamps of second set.

17. The backlight unit as claimed in claim 16, wherein the first power supply lines connect to the first common electrode through the plurality of first contact points, and the second power supply lines connect to the second common electrode through the plurality of second contact points.

18. The backlight unit as claimed in claim 16, wherein the third power supply lines connect to the third common electrode through the plurality of third contact points, and the fourth power supply lines connect to the fourth common electrode through the plurality of fourth contact points.

19. The backlight unit as claimed in claim 15, wherein the first and second common electrodes are provided with a slit formed therebetween, and the third and fourth common electrodes are provided with a slit formed therebetween.

20. The backlight unit as claimed in claim 15, wherein surfaces of the first to fourth common electrodes are treated with silk.

21. The backlight unit as claimed in claim 15, wherein the fluorescent lamps are cold cathode fluorescent lamps such that electrodes are formed inside two ends of the fluorescent lamps, and the first to fourth power supply lines are respectively replaced with one of the first to fourth power lead-in lines.

22. A backlight unit, comprising:
a case;
a plurality of fluorescent lamps arranged on the case N sets of lamps in N areas of the case, each fluorescent lamp of the each of the N sets has two ends with first and second electrodes respectively provided at the two ends;
N first and second power supply lines respectively connected with the first and second electrodes of the fluorescent lamps of each of the N sets;
N common electrode PCBs respectively arranged adjacent to ends of corresponding ones of the N sets, each of the N common electrode PCBs having first and second common electrodes formed thereon spaced apart from each other and connected with corresponding ones of the N first and second power supply lines;
first and second inverters to respectively apply power to the first and second electrodes of the fluorescent lamps of the N sets.

23. The backlight unit as claimed in claim 22, wherein the fluorescent lamps have a 'U' shape.

24. The backlight unit as claimed in claim 22, wherein the N common electrode PCBs provided with a plurality of first and second contact points that correspond to the respective ends of the fluorescent lamps of each of the N sets, the first power supply lines connect to the first common electrode through the plurality of first contact points, and the second power supply lines connect to the second common electrode through the plurality of second contact points.

25. The backlight unit as claimed in claim 22, wherein the first and second power supply lines are respectively connected with the first and second electrodes by winding a foil that has a conductivity.

26. The backlight unit as claimed in claim 22, wherein each of the first and second common electrodes are respectively provided with first and second voltage input lines at one end, the first to second common voltage input lines extend to respectively connect to the first and second inverters.

27. The backlight unit as claimed in claim 24, wherein the first and second power supply lines are respectively connected with the first and second contact points by soldering.

28. The backlight unit as claimed in claim 22, wherein the first and second common electrodes each have a curved shape.

29. The backlight unit as claimed in claim 22, wherein the first and second common electrodes each are made of a conductive material.

30. The backlight unit as claimed in claim 28, wherein the first and second common electrodes are provided with a slit formed therebetween.

31. The backlight unit as claimed in claim 22, wherein surfaces of the first and second common electrodes are treated with silk.

32. The backlight unit as claimed in claim 31, wherein silk treatment is performed by applying a non-conductive white dye onto each surface of the first and second common electrodes.

33. The backlight unit as claimed in claim 22, wherein the fluorescent lamps are external electrode fluorescent lamps, and electrodes are formed outside the two ends of the fluorescent lamps.

34. The backlight unit as claimed in claim 22, wherein the fluorescent lamps are cold cathode fluorescent lamps, and electrodes are formed inside the two ends of the fluorescent lamps.

* * * * *